US009460086B2

(12) United States Patent
Li et al.

(10) Patent No.: US 9,460,086 B2
(45) Date of Patent: Oct. 4, 2016

(54) METHOD AND APPARATUS FOR PERFORMING BILINGUAL WORD ALIGNMENT

(71) Applicants: The Boeing Company, Chicago, IL (US); Tsinghua University, Beijing (CN)

(72) Inventors: Peng Li, Beijing (CN); Yang Liu, Beijing (CN); Ping Xue, Redmond, WA (US); Maosong Sun, Beijing (CN)

(73) Assignees: The Boeing Company, Chicago, IL (US); Tsinghua University, Beijing (CN)

( * ) Notice: Subject to any disclaimer, the term of this patent is extended or adjusted under 35 U.S.C. 154(b) by 0 days.

(21) Appl. No.: 14/759,209

(22) PCT Filed: Dec. 6, 2013

(86) PCT No.: PCT/US2013/073742
§ 371 (c)(1),
(2) Date: Jul. 3, 2015

(87) PCT Pub. No.: WO2014/107265
PCT Pub. Date: Jul. 10, 2014

(65) Prior Publication Data
US 2015/0339291 A1    Nov. 26, 2015

(30) Foreign Application Priority Data
Jan. 7, 2013 (CN) .......................... 2013 1 0003841

(51) Int. Cl.
*G06F 17/28* (2006.01)
*G06F 17/30* (2006.01)

(52) U.S. Cl.
CPC .......... *G06F 17/28* (2013.01); *G06F 17/2827* (2013.01); *G06F 17/30684* (2013.01); *G06F 17/30687* (2013.01)

(58) Field of Classification Search
CPC ............ G06F 17/28; G06F 17/30687; G06F 17/30684; G06F 17/2827
USPC ................................. 704/218, 225, 255–257
See application file for complete search history.

(56) References Cited

U.S. PATENT DOCUMENTS

| | | | |
|---|---|---|---|
| 2006/0095248 A1* | 5/2006 | Menezes | G06F 17/2818 704/3 |
| 2006/0190241 A1* | 8/2006 | Goutte | G06F 17/2827 704/2 |
| 2012/0101804 A1* | 4/2012 | Roth | G06F 17/2818 704/2 |

FOREIGN PATENT DOCUMENTS

CN    101 667 177 A    3/2010

OTHER PUBLICATIONS

Peng Li et al.: "A Beam Search Algorithm for ITG Word Alignment", Proceedings of COLING 2012: Posters, Mumbai, India, pp. 673-682 (Dec. 2012).

(Continued)

*Primary Examiner* — Marcellus Augustin
(74) *Attorney, Agent, or Firm* — Miller, Matthias & Hull LLP

(57) ABSTRACT

A method for performing bilingual word alignment on source and target text in bilingual documents includes computing probability gains of adding a link (i.e. the corresponding relation) between any pair of source and target words in the source and target text; applying a greedy algorithm to iteratively search for a plurality of word alignments that satisfy an inversion transduction grammar constraint; and outputting the best word alignment among the plurality.

12 Claims, 4 Drawing Sheets

(56) References Cited

OTHER PUBLICATIONS

Yang Liu et al.: "Discriminative Word Alignment by Linear Modeling", Computational Linguistics, vol. 36, No. 3, pp. 303-339, (Jan. 2010).

Yang Liu et al.: "Log-linear models for word alignment", Proceedings of the 43rd annual Meeting of the Association for Computational Linguistics, pp. 459-466 (Jun. 2005).

* cited by examiner

METHOD AND APPARATUS FOR PERFORMING BILINGUAL WORD ALIGNMENT

TECHNICAL FIELD

The present invention relates to information processing field, particularly relates to a method and an apparatus for performing bilingual word alignment.

BACKGROUND

With the development of globalization, the needs for automatic or semi-automatic translation techniques grow rapidly. The aim of word alignment is to find the translation relation between the corresponding words of parallel bilingual text. Word alignment is a fundamental technique to provide the basis for statistical machine translation, i.e. a technology for automatically translating texts in one language into another by a computer using statistical methods, and it has significant influence on translation quality. In addition, word alignment provides a technique to support technologies such as cross-language retrieval.

Inversion transduction grammar is a family of bilingual synchronous grammars proposed by Dekai Wu. Each instance of inversion transduction grammar consists of several grammar rules, which define the transduction relationship between a particular set of symbols. A pair of start symbols may be synchronously rewritten into a pair of new strings by applying these rules. The inversion transduction grammar requires that each grammar rule should be in one of the following six forms:

s→ϵ/ϵ
A→x/ϵ
A→ϵ/y
A→x/y
A→[B C]
A→<B C> where ϵ denotes an empty string, the first four rules denote that the symbols on the left of the arrow can generate the two symbols on the right of the arrow. For example, the $4^{th}$ rule denotes that symbol A can generate symbol x and y; the $5^{th}$ rule denotes that symbol A can generate two strings "B C" and "B C" at the same time; the $6^{th}$ rule denotes that symbol A can generate two strings "B C" and "C B" at the same time.

Existing research shows that introducing the inversion transduction grammar constraint into word alignment (i.e. requiring that the word alignment can be generated with the inversion transduction grammar) significantly improves the quality of word alignment. The computational cost for searching over all possible word alignments that satisfy the inversion transduction grammar constraint is, however, too high to be used in practical. A few approximating search algorithms has been proposed to reduce computational cost by searching over only part of all the potential word alignments that satisfy the inversion transduction grammar constraint. The computational cost is still too high for practical use.

SUMMARY

A method and apparatus for performing bilingual word alignment reduces the computational cost while maintaining alignment quality and robustness.

In one aspect, the invention provides a method for performing bilingual word alignment, comprising:

1. preprocessing the source and target text of the bilingual documents;
2. computing the probability gains of adding a link between any word in the source text and a word in the target text;
3. setting the initial word alignment as an empty alignment, i.e. there is no link between any two words;
4. applying a greedy algorithm to search iteratively for word alignments that satisfy the inversion transduction grammar constraint.
5. outputting the best word alignment among the alignments found in steps 3-4 that satisfy the inversion transduction grammar constraint as the final alignment result.

In another aspect, the invention provides an apparatus for performing bilingual word alignment, comprising:

a preprocessing module for preprocessing the source and target text of the bilingual documents a probability computation module for computing the probability gains of adding a link between any source and target words, and selecting all links whose gains are positive;

an initial word alignment generation module for generating an initial word alignment;

a word alignment search module for applying a greedy algorithm to search iteratively for word alignments that satisfy the inversion transduction grammar constraint; and a word alignment result output module for outputting the best word alignment among the alignments found during the search process that satisfies the inversion transduction grammar constraint as the final alignment result.

BRIEF DESCRIPTION OF THE DRAWINGS

In order to clearly describe the technical solution, the embodiments of the present invention are described in detail below with reference to the following drawings. It is obvious that the following described drawings are only some of the embodiments of the invention, those skilled in the art may obtain other drawings according to these drawings without an inventive step.

DETAILED DESCRIPTION

In order to make the objectives, technical solutions and advantages of the present invention clear, the implementations of the present invention will be further described in combination with drawings with more details.

Embodiment 1

Figure 1:
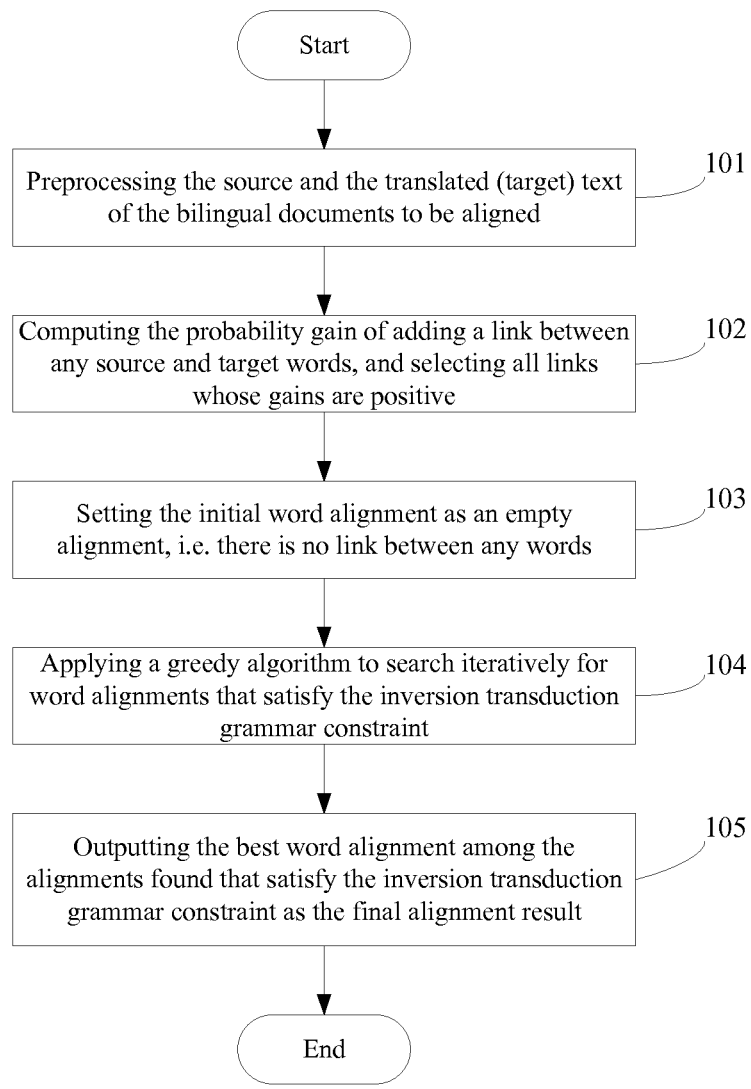
FIG. 1 is a flow chart of the method for performing bilingual word alignment provided by embodiment 1 of the present invention.

Referring to FIG. 1, this embodiment provides a method for performing bilingual word alignment. The workflow is as follows:

101. preprocessing the source and target text of the bilingual documents to be aligned;

102. computing the probability gain of adding a link between any source and target words, and selecting all links whose gains are positive;

103. setting the initial word alignment as an empty alignment, i.e. there is no link between any words;

104. applying a greedy algorithm to search iteratively for word alignments that satisfy the inversion transduction grammar constraint;

105. outputting the best word alignment among the alignments found during the search process that satisfies the inversion transduction grammar constraint as the final alignment result.

The method quickly produces robust word alignment.

Embodiment 2

Figure 2:
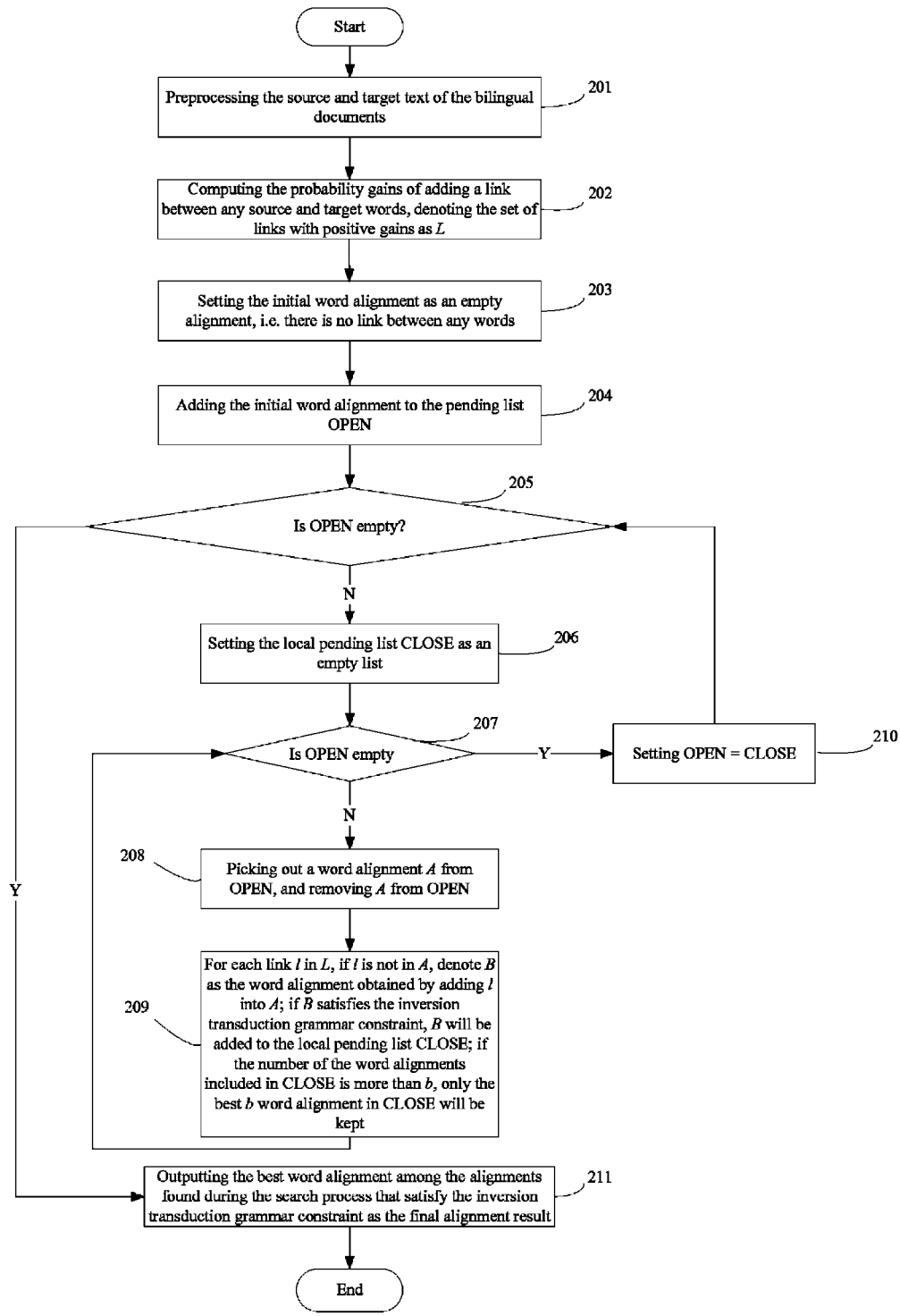
FIG. 2 is a flow chart of the method for performing bilingual word alignment provided by embodiment 2 of the present invention.

Referring to FIG. 2, this embodiment provides a method for performing bilingual word alignment. A greedy algorithm searches for word alignments that satisfy the inversion transduction grammar constraint in an iterative way. The embodiment of FIG. 2 can find word alignment with comparable quality more quickly than previous methods. The specific workflow is as follows:

201: preprocessing the source and target text of the bilingual documents;

Specifically, the preprocessing includes, but is not limited to, splitting the source and target text into individual words; removing redundant blank characters; recording the number of words in the source text (denoted as I), and the number of words in the target text (denoted as J)

202: computing the probability gains of adding a link between any source and target words, we denote the set of links with positive gains as L;

Specifically, the gain from adding a link between the $i^{th}$ source word $e_i$ and the $j^{th}$ target word $f_j$ is defined as $$\text{gain}(i, j) = \frac{p(f_j, e_i)}{p(f_j, \epsilon) \times p(\epsilon, e_i)}$$

where $p(f_j, e_i)$ is the probability of $e_i$ that is aligned to $f_j$; $p(\epsilon, e_i)$ is the probability of $e_i$ that is not aligned to any word; $p(f_j, \epsilon)$ is the probability of $f_j$ that is not aligned to any word. These probabilities could be estimated by any existing method or method that may be invented in the future, not limited by this embodiment. One of the possible implementations is as follows: $p(f_j, e_i)$, $p(\epsilon, e_i)$ and $p(f_j, \epsilon)$ could be estimated by the translation probabilities proposed in model 4 in the paper *The Mathematics of Statistical Machine Translation: Parameter Estimation* by P. F. Brown, et al, specifically $$p(f_j, e_i) = \frac{p_{m4}(f_j \mid e_i) \times p_{m4}(e_i \mid f_j)}{2}$$

$$p(f_j, \epsilon) = p_{m4}(f_j \mid \epsilon)$$

$$p(\epsilon, e_i) = p_{m4}(e_i \mid \epsilon)$$

where $p_{m4}(f_j|e_i)$, $p_{m4}(e_i|f_j)$, $p_{m4}(f_j|\epsilon)$, $p_{m4}(e_i|\epsilon)$ are the translation probabilities proposed in model 4 by Brown, et al.

203: setting the initial word alignment as an empty alignment, i.e. there is no link between any words;

204: adding the initial word alignment to the pending list OPEN;

205: judging whether the pending list OPEN is empty, i.e. OPEN does not contain any word alignment; if yes, step 211 is performed; otherwise, step 206 is performed;

206: setting the local pending list CLOSE as an empty list;

207: judging whether the pending list OPEN is empty, i.e. OPEN does not contain any word alignment; if yes, step 210 is performed; otherwise, step 208 is performed;

208: picking out a word alignment A from the pending list OPEN, and removing A from OPEN; This embodiment does not impose any restriction on the picking strategy.

209: For each link l in L, if l is not in A, denote B as the word alignment obtained by adding l into A; if B satisfies the inversion transduction grammar constraint, B will be added to the local pending list CLOSE; if the number of the word alignments included in CLOSE is more than b, only the best b word alignments in CLOSE will be kept;

This step could use any existing method or method that may be invented in the future to determine whether a word alignment satisfies the inversion transduction grammar constraint.

The following formula is used to evaluate the quality of a word alignment, the higher the value of the formula is, the better the word alignment is:

$$\prod_{(j,i) \in a} p(f_j, e_i) \times \prod_{i \notin a} p(\epsilon, e_i) \times \prod_{j \notin a} p(f_j \mid \epsilon)$$

The formula consists of three parts: the first part is the product of all the values of $p(f_j, e_i)$ for any pair of $f_j$ and $e_i$ that have a link between them, the second part is the product of all the values of $p(\epsilon, e_i)$ for any source word which is not aligned to any word, and the third part is the product of all the values of $p(f_j, \epsilon)$ for any target word which is not aligned to any word, and the formula represents a product of the three parts. The definitions for $p(f_j, e_i)$, $p(\epsilon, e_i)$ and $p(f_j, \epsilon)$ are the same as those in step 209.

This embodiment imposes one and only one limit. That is b should be a number no smaller than 1. The specific value of b depends on the requirement of word alignment speed and the quality of the word alignment in a practical scenario. The smaller b is, the faster the speed is and the poorer the quality of the word alignment will be; the larger b is, the slower the speed is and the better the quality of the word alignment will be.

210: setting OPEN=CLOSE;

211: outputting the best word alignment among the alignments found during the search process that satisfy the inversion transduction grammar constraint as the final alignment result. This step has the same evaluating standard for word alignment quality with step 209.

Embodiment 3

Figure 3:
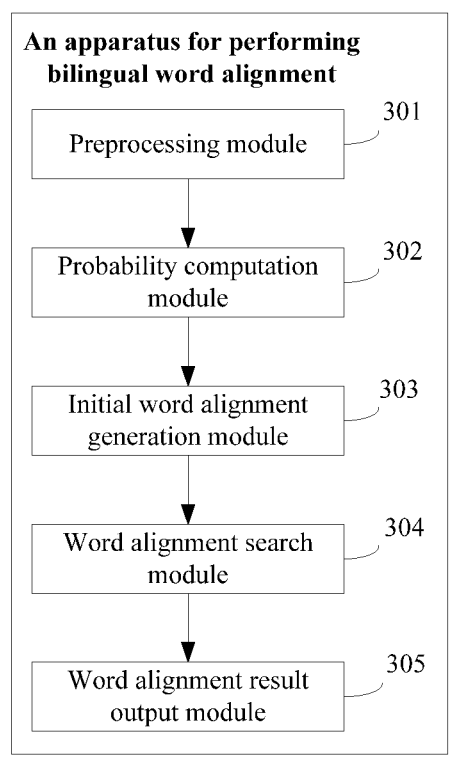
FIG. 3 is a schematic diagram of the apparatus for performing bilingual word alignment provided by embodiment 3 of the present invention.

FIG. 3 refers to an apparatus for performing bilingual word alignment comprising:

a preprocessing module 301 for preprocessing the source and target text of the bilingual documents to be aligned;

a probability computation module 302 for computing the gains of adding a link between any source and target words, and selecting all links whose gains are positive;

an initial word alignment generation module 303 for generating an initial word alignment;

a word alignment search module 304 for using a greedy algorithm to search iteratively for word alignments that satisfies the inversion transduction grammar constraint; and a word alignment result output module 305 for outputting the best word alignment among the alignments found during the search process that satisfy the inversion transduction grammar constraint as the final alignment result.

Specifically, the preprocessing module 301 is for splitting the source and target texts into individual words; removing redundant blank characters, and recording the number of words in the source text (denoted as I), and the number of words in the target text (denoted as J).

In the probability computation module 302, the gain of adding a link between the $i^{th}$ source word $e_i$, and the $j^{th}$ target word $f_j$ is defined as $$\text{gain}(i, j) = \frac{p(f_j, e_i)}{p(f_j, \epsilon) \times p(\epsilon, e_i)}$$

where $p(f_j, e_i)$ is the probability of $e_i$ that is aligned to $f_j$; $p(\epsilon, e_i)$ is the probability of $e_i$ that is not aligned to any word; $p(f_j, \epsilon)$ is the probability of $f_j$ that is not aligned to any word.

In the initial word alignment generation module 303, the initial alignment is set as an empty alignment, i.e. there is no link between any words.

In the word alignment result output module 305, the following formula is used to evaluate the quality of a word alignment:

$$\prod_{(j,i) \in a} p(f_j, e_i) \times \prod_{i \notin a} p(\epsilon, e_i) \times \prod_{j \notin a} p(f_j \mid \epsilon)$$

the formula consists of three parts: the first part is the product of all the values of $p(f_j, e_i)$ for any pair of $f_j$ and $e_i$ that have a link between them, the second part is the product of all the values of $p(\epsilon, e_i)$ for any source word which is not aligned to any word, and the third part is the product of all the values of $p(f_j, \epsilon)$ for any target word which is not aligned to any word, and the formula is a product of the three parts. The definitions for $p(f_j, e_i)$, $p(\epsilon, e_i)$ and $p(f_j, \epsilon)$ are the same as those in the link gain computation module 302.

Figure 4:
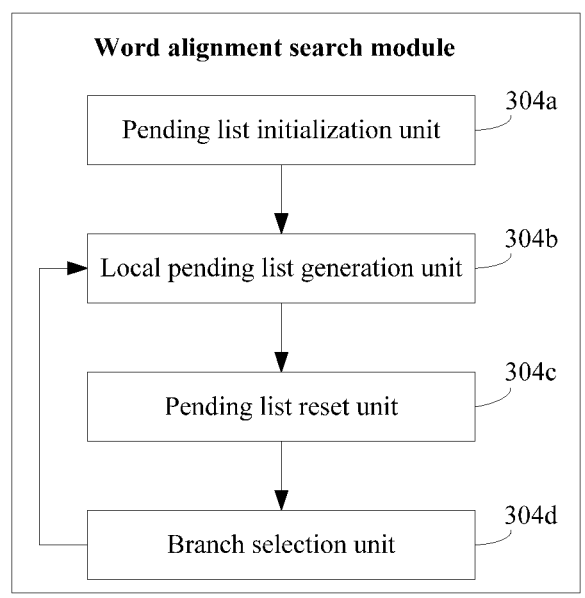
FIG. 4 is a schematic diagram of the word alignment search module structure in the apparatus for performing bilingual word alignment provided by embodiment 3 of the present invention.

Furthermore, FIG. 4 refers to word alignment search module 304, including:
a pending list initializing unit 304a, for initializing a pending list as a list only including empty word alignment;
a local pending list generation unit 304b, for expanding the word alignments in the pending list, and generating a local pending list;
a pending list resetting unit 304c, for resetting the pending list into the local pending list; and
a branch selecting unit 304d, for determining whether to return to unit 304b or end the entire word alignment searching module 304 and then enter into the word alignment result output module 305.

Wherein in the local pending list generation unit 304b, supposing L is the set of links which have positive gains that are computed in the link gain computation module 302; for each link l in L, if l is not in A, denote B as the word alignment obtained by adding l into A; if B satisfies the inversion transduction grammar constraint, B will be added into the local pending list; if the number of the word alignments included in the local pending list is more than b, only the best b word alignments in the local pending list will be kept.

Wherein in the branch selecting unit 304d, if the pending list is not empty, the process returns to unit 304b, otherwise it enters the word alignment result output module 305.

The above embodiments of the present invention are provided in that order only for description and exposition purpose, not indicating relative importance of any specific embodiments.

Part of the steps in the embodiments of the present application can be implemented by software, which can be stored in the computer readable storage medium, such as CD or hard disk, etc.

The above embodiments are only some preferable example embodiments of the present invention, rather than indicating limits for this invention. Any modifications, substitution or duplication, and improvement, etc., under the spirit and principles of the present invention should be regarded as included within the protection scope of the present invention.

What is claimed is:

1. A method for performing bilingual word alignment on source and target text in bilingual documents, the method comprising:
   computing probability gains of adding a link between any pair of source and target words in the source and target text;
   applying a greedy algorithm to iteratively search for a plurality of word alignments that satisfy an inversion transduction grammar constraint, wherein applying the greedy algorithm includes:
   initializing a pending list;
   generating a local list by performing an expanding operation to each word alignment in the pending list, and adding to the local list new word alignments that satisfy the inversion transduction grammar constraint;
   determining whether to update the lists after each iteration according to whether the pending list is empty; and
   outputting the best alignment from the word alignments in the local list; and
   outputting a best word alignment among the plurality as a final alignment result.

2. The method of claim 1, further comprising preprocessing the source and target text to produce the source and target words, including:
   splitting the source and target text into individual words;
   removing redundant blank characters; and
   recording a number of words in the source text, and a number of words in the target text.

3. The method of claim 1, wherein the probability gains are computed as $$\text{gain}(i, j) = \frac{p(f_j, e_i)}{p(f_j, \epsilon) \times p(\epsilon, e_i)}$$

where $e_i$ is an $i^{th}$ source word, $f_j$ is a $j^{th}$ target word, $p(f_j, e_i)$ is a probability of $e_i$ that is aligned to $f_j$, $p(\epsilon, e_i)$ is a probability of $e_i$ that is not aligned to any word, and $p(f_j, \epsilon)$ is a probability of $f_j$ that is not aligned to any word.

4. The method of claim 1, wherein performing the expanding operation to each word alignment includes:

for each word alignment A in the pending list and link l in L, if l is not in A, then adding l to A to produce a new word alignment, where L is a set of links that have positive gains.

5. The method of claim 1, wherein if the word alignment in the pending list does not satisfy the inversion transduction grammar constraint, then the word alignment is not added to the local list.

6. The method claim 1, wherein outputting the best word alignment includes measuring quality of a word alignment as a product of
   (a) all probability values $\Pi(j,i)\ p(f_j, e_i)$ that are members of set a, and for any pair of $f_j$ and $e_i$ that have a link between them, and
   (b) all probability values $\Pi(i)\ p(\epsilon, e_i)$ that are not members of set a, and for any source word that is not aligned to any word, and
   (c) all probability values $\Pi(j)\ p(f_j, \epsilon)$ that are not members of set a, for any target word that is not aligned to any word, where $p(f_j, e_i)$ is a probability of $e_i$ that is aligned to $f_j$; $p(\epsilon, e_i)$ is a probability of $e_i$ that is not aligned to any word; and $p(f_j, \epsilon)$ is a probability of $f_j$ that is not aligned to any word, whereby $$\prod_{(j,i) \in a} p(f_j, e_i) \times \prod_{i \notin a} p(\epsilon, e_i) \times \prod_{j \notin a} p(f_j \mid \epsilon).$$

7. An apparatus for performing bilingual word alignment on source and target text in bilingual documents, comprising:
   a link gain computation module for computing a probability gain of adding a link between any source and target words in the source and target text, and selecting all links having positive gains;
   a word alignment search module for using a greedy algorithm to iteratively search for a plurality of word alignments that satisfy an inversion transduction grammar constraint, the word alignment search module further including:
      a pending list initializing unit for initializing a pending list;
      a local list generation unit for expanding word alignments in the pending list, and generating a local list; and
      a branch selecting unit for determining whether to return to the local list generation unit; and
   a word alignment result output module for outputting a best word alignment measured by quality among the plurality.

8. The apparatus of claim 7, further comprising a preprocessing module for splitting the source and target text into individual words and removing redundant blank characters, and recording a number of words in the source text and a number of words in the target text.

9. The apparatus of claim 7, wherein the probability gains are computed as:

$$\text{gain}(i, j) = \frac{p(f_j, e_i)}{p(f_j, \epsilon) \times p(\epsilon, e_i)}$$

where $e_i$ is an $i^{th}$ source word; $f_j$ is a $j^{th}$ target word; $p(f_j, e_i)$ is a probability of $e_i$ that is aligned to $f_j$; $p(\epsilon, e_i)$ is a probability of $e_i$ that is not aligned to any word; and $p(f_j, \epsilon)$ is a probability of $f_j$ that is not aligned to any word.

10. The method of claim 7, wherein the local list generation unit is configured to perform
    an expanding operation to each word alignment in the pending list, and add new word alignments that satisfy the inversion transduction grammar constraint to the local list;
    wherein if a number of the new word alignments in the local list is more than b, then b word alignments are kept in the local list according to a measured quality.

11. The apparatus of claim 10, wherein performing the expanding operation, includes:
    for each word alignment A in the pending list and link l in L, if l is not in A, adding l to A to produce a new word alignment, where L is a set of links having positive gains.

12. The apparatus according to claim 7, wherein the quality of a word alignment is measured as a product of
    all probability values $\Pi(j,i)\ p(f_j, e_i)$ that are members of set a, and for any pair of $f_j$ and $e_i$ that have a link between them, and
    all probability values $\Pi(i)\ p(\epsilon, e_i)$ that are not members of set a, and for any source word that is not aligned to any word, and
    all probability values $\Pi(j)\ p(f_j, \epsilon)$ that are not members of set a, for any target word that is not aligned to any word, where $p(f_j, e_i)$ is a probability of $e_i$ that is aligned to $f_j$; $p(\epsilon, e_i)$ is a probability of $e_i$ that is not aligned to any word; and $p(f_j, \epsilon)$ is a probability of $f_j$ that is not aligned to any word.

\* \* \* \* \*